June 22, 1965 A. AMOROSI ET AL Re. 25,808

HEAT EXCHANGER

Original Filed Oct. 23, 1959

INVENTORS
Alfred Amorosi
John J. Morabito
BY
Balluff and McKinley
ATTORNEYS.

United States Patent Office

Re. 25,808
Reissued June 22, 1965

25,808
HEAT EXCHANGER

Alfred Amorosi and John J. Merabito, Birmingham, Mich., assignors to Atomic Power Development Associates, Inc., Detroit, Mich., a corporation of New York Original No. 3,090,433, dated May 21, 1963, Ser. No. 848,298, Oct. 23, 1959. Application for reissue Apr. 29, 1964, Ser. No. 377,153
3 Claims. (Cl. 165—11)

Figure 1:
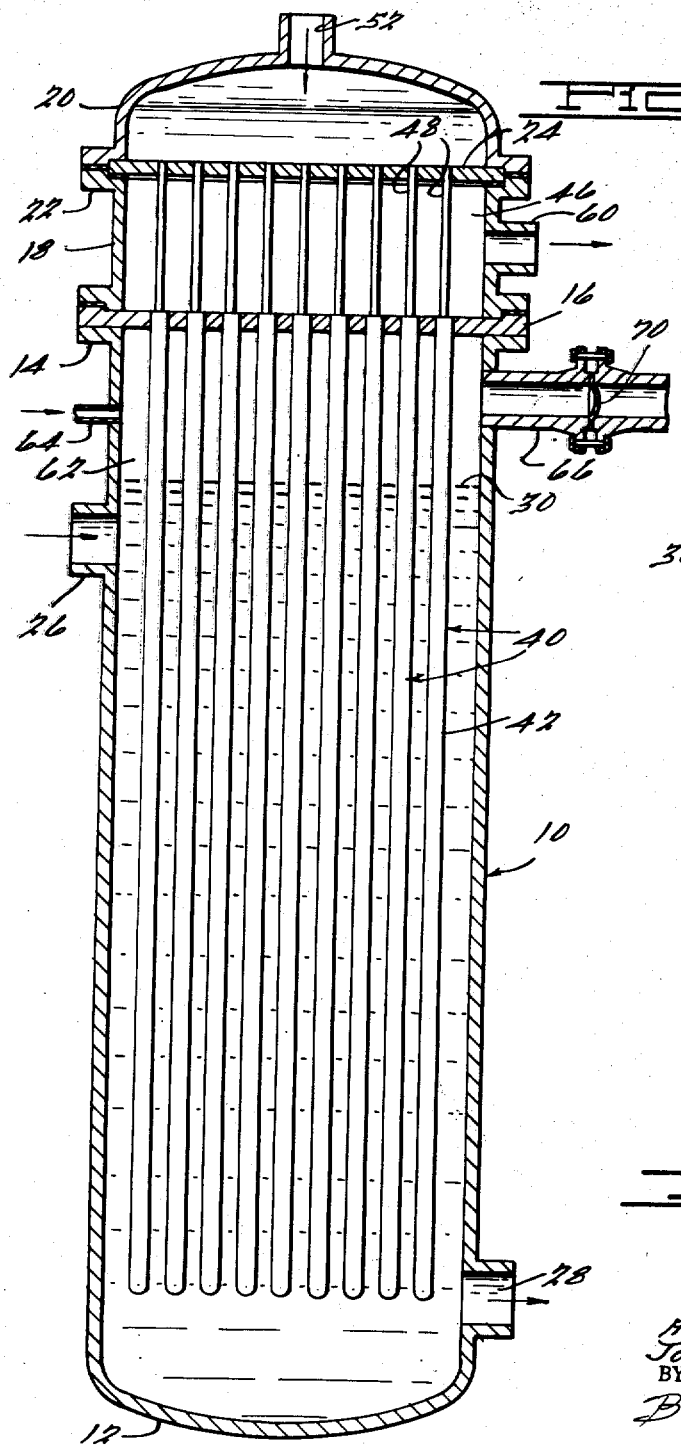

Matter enclosed in heavy brackets [ ] appears in the original patent but forms no part of this reissue specification; matter printed in italics indicates the additions made by reissue.

This invention relates to heat exchangers in general and has particular reference to a steam generator for converting water into steam by the addition of heat thereto from a higher temperature liquid. More particularly, the invention relates to a steam generator in which water is circulated through a series of tubes which extend into a body of liquid contained within a tank and from which heat is absorbed to convert the water into steam.

A steam generator of the type described herein is suitable for use as a heat exchanger for producing high temperature steam for operating a steam turbine to generate electricity.

The heat exchanger described herein is designed to provide an interchange of heat between liquid sodium and water, which presents many problems in that provision must be made for the possibility of a break or failure of one of the tubes of the heat exchanger which would result in contacting water with the sodium. The resultant reaction between the water and sodium would, of course, generate high pressures within the heat exchanger and the possibility of the occurrence of such pressures must be taken into consideration in the design of the heat exchanger for safety reasons as well as for other considerations. Since a heat exchanger of this type must be very large, it would be very difficult and expensive to design and build a container structure sufficiently strong to withstand the pressures that might be encountered in the event of a tube break or other failure of some part of the heat exchanger. The present invention provides a heat exchanger of the type described having provisions for preventing the build-up of high pressures within the heat exchanger in the event of a tube failure so that the heat exchanger need not be unduly heavy or expensive and, in fact, may be considerably lighter and less expensive than a heat exchanger of comparable capacity not provided with the pressure relief system of the present invention.

The steam generator disclosed herein consists essentially of a container or tank structure through which liquid sodium is circulated and a series of heat exchange tube assemblies extending downwardly into the body of liquid sodium contained within the tank. The water and the steam generated therefrom are circulated through the tubes out of contact with the liquid sodium. In accordance with the present invention, an inert gas space is provided above the liquid sodium within the tank to provide a surge chamber and an outlet or discharge line leading from the inert gas space is normally closed by a frangible diaphragm which is designed to rupture or break at pressures in excess of the pressure normally maintained within the inert gas space, thereby to open the discharge line to carry off the reaction products of the water and sodium and dissipate the pressure in the tank in the event of a break or rupture of one of the heat exchange tubes.

The principal object of the invention is to provide a heat exchange device for the exchange of heat between two liquids which, if brought into contact, would generate high pressures within the heat exchanger.

It is a further object of the invention to provide a heat exchanger of this type having provisions for preventing the build-up of high pressures within the heat exchanger.

A further object of the invention is to provide a heat exchanger of the type described having pressure relief means incorporated therein so that the weight and the manufacturing cost of the heat exchanger may be kept at a minimum.

Other and further objects of the invention will be apparent from the following description and claims and may be understood by reference to the accompanying drawing, which by way of illustration shows a preferred embodiment of the invention and what we now consider to be the best mode of applying the principles thereof. Other embodiments of the invention may be used without departing from the scope of the present invention as set forth in the appended claims.

Figure 2:
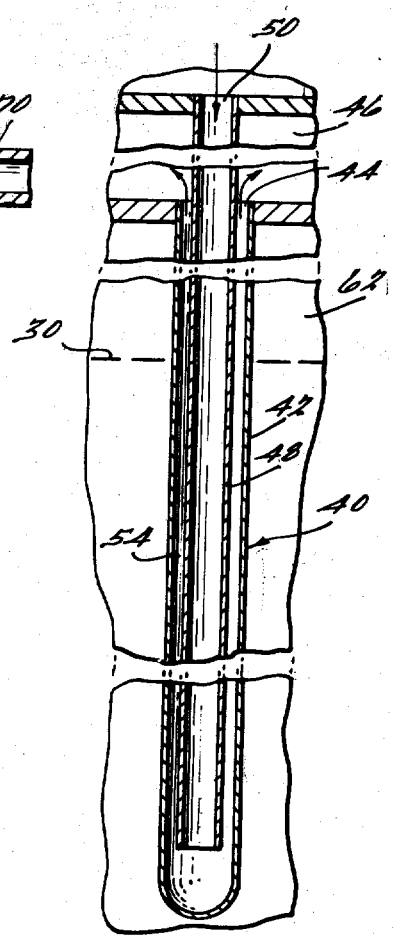

In the drawing:

FIG. 1 is a vertical sectional view through a heat exchanger embodying the present invention; and FIG. 2 is a vertical sectional view through one of the heat exchange tube assemblies employed in the heat exchanger.

The heat exchanger includes a generally cylindrical vertically diposed tank 10 having a bottom wall 12 and an annular flange 14 at its upper end against which a tube sheet 16 is seated. A steam header 18 in the form of a cylindrical ring is seat upon the tube sheet 16 and an inlet header 20 forms the top of the heat exchanger and seats against the upper rim 22 of the header 18. A second tube sheet 24 is clamped between the flange 22 and the underside of the inlet header 20. Suitable gaskets may be provided between the several parts described to provide a sealed tank structure.

The tank 10 is provided with an inlet fitting 26 through which liquid sodium is supplied to the tank. The tank is provided with an outlet 28 adjacent its lower end. The liquid sodium is pumped through the tank 10 by suitable pumping means forming no part of the present invention. The sodium is maintained at a level within the tank indicated by the line 30.

A series of tube assemblies 40 extends downwardly into the liquid sodium contained in the tank 10. Each tube assembly 40 comprises an outer tube 42 secured to and extending downwardly from the tube sheet 16. The tubes 42 are closed at their lower ends and at their upper ends 44 open into the space 46 defined between the tube sheets 16 and 24. Each tube assembly further includes an inner tube 48 secured to and supported from the tube sheet 24 and extending downwardly therefrom into the tube 42 in concentric relation thereto. The water tubes 48 are open at their upper ends 50 so as to be supplied with water entering the inlet header 20 through the water inlet 52. The tubes 48 terminate at their lower ends adjacent the bottom of the outer tubes 42. The water to be converted to steam flows into the inlet 52 and downwardly through the tubes 48 and then upwardly through the annular spaces 54 defined between the tubes 48 and the tubes 42. As the water passes upwardly through the annular spaces 54 in counterflow heat exchange relation with the liquid sodium circulating downwardly through the tank 10, the water is converted into steam which passes through the upper ends 44 of the tubes 42 into the steam header 46 from which the steam is drawn off through the outlet 60.

The space between the level of the sodium 30 and the tube sheet 16 defines a surge chamber 62 which may be filled with an inert gas. The tank is provided with an inlet 64 through which an inert gas such as argon may be supplied to the space 62 and maintained therein at a predetermined pressure. A discharge pipe 66 leads from the surge chamber 62 and is closed by a pressure relief diaphragm 70 which may be made of a suitable frangible material which will break or rupture in the event the pressure within the chamber 62 increases substantially above the normal pressure maintained therein.

A heat exchanger of this type is necessarily a very large structure and may be of the order of 30 feet or more in height and may contain several hundred individual tube assemblies. Since the two liquids involved here will react chemically if contacted with each other and generate high pressure reaction products, a heat exchanger of this character would ordinarily have to be constructed of very thick and expensive materials in order to provide a safety factor in the event of a failure in one or more of the tube assemblies such as would result in contacting the liquid sodium with the water. The insert gas chamber 62 and the pressure relief diaphragm 70 provide a means for obivating the necessity of constructing the tank 10 from unduly heavy and expensive materials. In the event of a tube failure, the resultant high pressures resulting from the reaction between the two liquids may expand into the inert gas space 62 to maintain the pressure to which the tank 10 is subjected below a certain critical value. If the pressure rises sufficiently within the chamber 62, the diaphragm 70 will rupture to open the discharge line 66 and enable the reaction products to be drawn off through the discharge line to maintain the pressure within the tank 10 below its critical value.

A heat exchanger of the type described may be required to handle several hundred thousand pounds of liquid sodium per hour at a temperature of several hundred degrees and, similarly, the flow rate of the water may be of the order of several hundred thousand pounds per hour at somewhat lower temperatures, while the steam will be heated to nearly the temperature of the incoming sodium at pressures of several hundred pounds per square inch. It will, therefore, be appreciated that, the problems involved in using heat exchange liquids of this type at such temperatures and pressures, would require very heavy and expensive equipment without the safety factors provided by the present invention.

While the present invention has been described in connection with a heat exchanger employing liquid sodium and water as the two heat exchange mediums, it will be apparent that this invention will be useful in other applications and in other heat exchangers in which heat is exchanged between two different liquids than those described herein.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. A heat exchanger for the exchange of heat between two liquids which react to generate high pressure gases when mixed, comprising a tank having an inlet for one of said liquids at its upper end, a tube sheet extending across said tank below said inlet, a second tube sheet extending across said tank in spaced relation to and below said first tube sheet, a series of tube assemblies each comprising an outer tube supported by said second tube sheet and extending therefrom downwardly into said tank and an inner tube supported by said first tube sheet and extending therefrom downwardly into said outer tube in concentric relation thereto, said outer tubes being closed at their lower ends and communicating at their upper ends with the space between said tube sheets, said inner tubes being open at their lower ends and terminating adjacent the lower ends of said outer tubes, said inner tubes communicating at their upper ends with said inlet, said tank having an outlet for said one liquid leading from the space between said tube sheets, said tank being adapted to contain a body of the other of said liquids therein at a predetermined level below said second tube sheet and having an inlet for the other liquid below said second tube sheet and an outlet therefor at the lower end of said tank, pressure surge dissipator means comprising a body of an inert gas contained by said tank above the level of said other liquid, an inlet in said tank above the level of said other liquid for maintaining said body of insert gas at a predetermined pressure, a further outlet from said tank, said futrher outlet also being located above the level of said other liquid, and a pressure relief diaphragm normally closing said last-mentioned outlet and adapted to rupture upon exposure to a substantial increase in the pressure in said tank to provide an outlet for the reaction products of the liquids in the event of a tube break.

2. A heat exchanger for the exchange of heat between two liquids which react to generate high pressure gases when mixed, comprising a tank adapted to contain a body of one of said liquids therein, said tank having an inlet for the other of said liquids at its upper end, a tube sheet extending across said tank below said inlet, a second tube sheet extending across said tank in spaced relation to and below said first tube sheet, a series of tube assemblies each comprising an outer tube supported by said second tube sheet and extending therefrom downwardly into the liquid in said tank and an inner tube supported by said first tube sheet and extending therefrom downwardly into said outer tube in concentric relation thereto, said outer tubes being closed at their lower ends and communicating at their upper ends with the space between said tube sheets, said inner tubes being open at their lower ends and communicating at their upper ends with said inlet, said tank further being provided with an outlet from the space between said tube sheets, said body of liquid in said tank being maintained at a level substantially below said second tube sheet, pressure surge dissipator means comprising a body of inert gas enclosed within the space between said second tube sheet and the body of liquid in said tank, an inlet in said tank for maintaining said body of inert gas at a predetermined pressure in said last-mentioned space, a further outlet in said tank leading from said last-mentioned space, and a pressure relief diaphragm normally closing said last-mentioned outlet and adapted to rupture upon exposure to a substantial increase in the pressure in said tank to provide an outlet for the reaction products of the liquids in the event of a tube break.

*3. A heat exchanger comprising a tank containing two incompatible fluids, a series of heat exchange elements disposed within said tank through which one of said fluids is circulated out of contact and in heat exchange relation with the other of said fluids, closure means for the top of said tank, a surge chamber defined by the upper portion of said tank, by said closure means and by the upper surface of said other fluid, an inlet in said tank for maintaining a body of inert gas at a predetermined pressure in said surge chamber, and normally closed outlet means for said surge chamber adapted to open in response to a substantial increase in pressure in said surge chamber.*

References Cited by the Examiner

The following references, cited by the Examiner, are of record in the patented file of this patent or the original patent.

UNITED STATES PATENTS

| | | | |
|---|---|---|---|
| 2,370,870 | 3/45 | McKeague | 220—89 |
| 2,711,882 | 6/55 | Narbutovskih | 165—47 |
| 2,853,277 | 9/58 | Boni et al. | 165—11 |
| 2,971,746 | 2/61 | Bell | 165—107 X |

FOREIGN PATENTS

| | | |
|---|---|---|
| 1,141,588 | 3/57 | France. |

ROBERT A. O'LEARY, *Primary Examiner.*

CHARLES SUKALO, *Examiner.*